United States Patent
Tone (10) Patent No.: US 10,493,871 B2
(45) Date of Patent: Dec. 3, 2019

(54) LOCK DEVICE

(71) Applicant: AISIN SEIKI KABUSHIKI KAISHA, Kariya-shi (JP)

(72) Inventor: Daisuke Tone, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 652 days.

(21) Appl. No.: 15/114,339

(22) PCT Filed: Jan. 22, 2015

(86) PCT No.: PCT/JP2015/051654
§ 371 (c)(1),
(2) Date: Jul. 26, 2016

(87) PCT Pub. No.: WO2015/115299
PCT Pub. Date: Aug. 6, 2015

(65) Prior Publication Data
US 2017/0008427 A1 Jan. 12, 2017

(30) Foreign Application Priority Data
Jan. 31, 2014 (JP) .................................. 2014-017059

(51) Int. Cl.
*E05B 15/04* (2006.01)
*B60N 2/22* (2006.01)
(Continued)

(52) U.S. Cl.
CPC ............. *B60N 2/2245* (2013.01); *B60N 2/20* (2013.01); *B60N 2/2218* (2013.01); *E05B 77/38* (2013.01); *Y10S 292/61* (2013.01); *Y10T 292/68* (2015.04)

(58) Field of Classification Search
CPC .. Y10T 292/68; Y10T 292/696; Y10S 292/55; Y10S 292/56; Y10S 292/61; E05B 77/38; E05B 2015/0458; E05B 17/0037
See application file for complete search history.

(56) References Cited

U.S. PATENT DOCUMENTS 4,869,536 A * 9/1989 Kleefeldt ................ E05B 77/38
292/210
5,918,918 A * 7/1999 Mosley .................. E05B 77/38
292/341.12
(Continued)

FOREIGN PATENT DOCUMENTS

CN 200940365 Y 8/2007
DE 2333060 A1 * 1/1975 ............. E05B 5/243
(Continued)

OTHER PUBLICATIONS

International Search Report dated Apr. 21, 2015 for PCT/JP2015/051654 filed on Jan. 22, 2015.
(Continued)

*Primary Examiner* — Carlos Lugo
(74) *Attorney, Agent, or Firm* — Oblon, McClelland, Maier & Neustadt, L.L.P.

(57) ABSTRACT

A lock device is provided with: a latch unit having a slit which allows a striker to enter and exit and configured to engage with and to be disengaged from the striker; and a support member for supporting a spring member outside the latch unit in such a manner that the spring member extends in the width direction of the slit. The spring member is elastically deformed when in contact with the striker having entered the slit, and as a result, the spring member applies pressing force to the striker, the pressing force acting in the direction in which the striker exits the slit.

5 Claims, 5 Drawing Sheets

(51) Int. Cl.
*E05B 77/38* (2014.01)
*B60N 2/20* (2006.01)
*E05B 17/00* (2006.01)

(56) References Cited

U.S. PATENT DOCUMENTS

| | | | | |
|---|---|---|---|---|
| 7,344,169 | B2 * | 3/2008 | Han | E05B 85/045 |
| | | | | 292/340 |
| 7,410,217 | B2 * | 8/2008 | Inoue | B60N 2/366 |
| | | | | 297/378.13 |
| 8,047,584 | B2 * | 11/2011 | Rock | E05B 17/0037 |
| | | | | 292/340 |
| 8,550,508 | B2 * | 10/2013 | Gentile | E05B 17/0037 |
| | | | | 292/341.15 |
| 8,590,973 | B2 * | 11/2013 | Matsuura | B60N 2/366 |
| | | | | 292/216 |
| 8,727,403 | B2 * | 5/2014 | Johnson | E05B 15/022 |
| | | | | 292/340 |
| 8,894,153 | B2 * | 11/2014 | Ohba | B60N 2/2352 |
| | | | | 297/378.13 |
| 2006/0087126 | A1 | 4/2006 | Roussel | |
| 2009/0267359 | A1 | 10/2009 | Takayanagi et al. | |
| 2012/0133188 | A1 | 5/2012 | Wieclawski et al. | |

FOREIGN PATENT DOCUMENTS

| | | | | |
|---|---|---|---|---|
| DE | 3825594 | A1 * | 2/1990 | E05B 5/26 |
| DE | 10324339 | A1 * | 12/2004 | E05B 85/02 |
| EP | 2251509 | A2 * | 11/2010 | E05B 83/16 |
| EP | 3238982 | A1 * | 11/2017 | B60N 2/20 |
| JP | 56-9816 | | 3/1981 | |

OTHER PUBLICATIONS

International Preliminary Report on Patentability and Written Opinion dated Aug. 2, 2016 in PCT/JP2015/051654.

Office Action datd Apr. 5, 2017 in Chinese Patent Application No. 201580005765.7.

Examination Report dated Aug. 6, 2019 for India Patent Application No. 201617028879.

\* cited by examiner

LOCK DEVICE

TECHNICAL FIELD

The present invention relates to a lock device.

BACKGROUND ART

A latch unit that is engaged with and disengaged from a striker generally includes a slit that allows for the entrance and exit of the striker.

For example, patent document 1 describes a lock device in which the latch unit includes a holding member (housing) having a generally U-shaped cross-section. The holding member includes two opposing side walls. Additionally, the two side walls are cut to form slits (striker openings) in the holding member. A latch mechanism is held inside the holding member. The latch mechanism includes a latch (latch arm) that is engaged with and disengaged from the striker entering the slits.

In the prior art, a spring member is incorporated in the holding member of the latch unit. The spring member is capable of applying urging force to the striker, which has entered the slits, in an exit direction. Thus, the lock device has a so-called pop-up function that allows the striker to quickly exit the slits when disengaged from the engagement with the latch unit.

PRIOR ART DOCUMENT

Patent Document

Patent Document 1: US Patent Application Publication No. 2012/0133188

SUMMARY OF THE INVENTION

Problems that are to be Solved by the Invention

The incorporation of the pop-up spring member in the latch unit complicates the manufacturing process. For example, the specifications of the components forming the latch unit such as the latch and the holding member most likely need to be changed in accordance with the incorporated spring member. In this regard, there is room for improvement in the prior art.

It is an object of the present invention to provide a lock device that has a pop-up function having a simpler structure.

Means for Solving the Problem

To achieve the above object, one aspect provides a lock device that includes a latch unit configured to be engaged with and disengaged from a striker and including a slit that allows for entrance and exit of the striker and a support member that supports a spring member outside the latch unit so that the spring member extends in a width-wise direction of the slit. When the striker enters the slit and contacts the spring member, the spring member elastically deforms and applies urging force to the striker in a direction in which the striker exits from the slit.

EMBODIMENTS OF THE INVENTION

One embodiment of a lock device adapted to be located in a vehicle seat will now be described with reference to the drawings.

Figure 1:
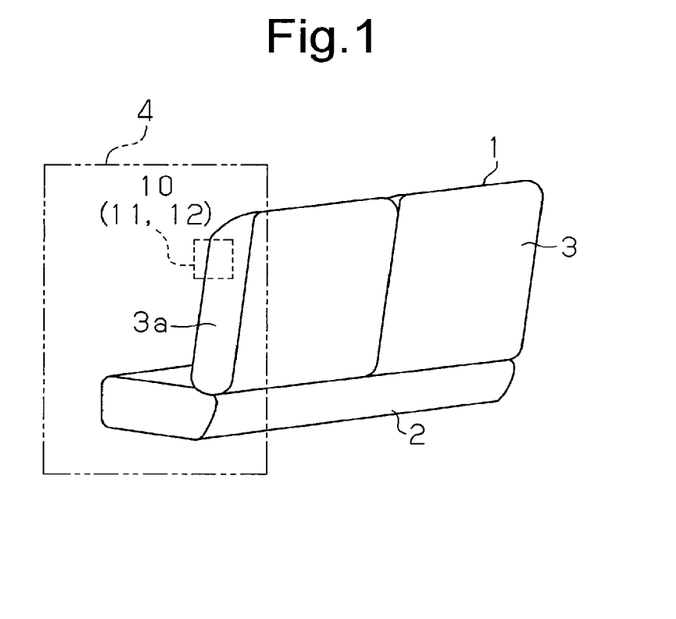
FIG. 1 is a diagram showing the position of a lock device.

As shown in FIG. 1, a seat 1 for a vehicle includes a seat cushion 2 and a seatback 3, which is located on a rear end of the seat cushion 2 and inclinable relative to the seat cushion 2. In the present embodiment, the seat 1 is used as a rear seat of the vehicle. Additionally, a lock device 10 is located between the seat 1 and a vehicle body 4 located beside the seat 1. The lock device 10 is capable of restraining an upper end portion of the seatback 3 to the vehicle body 4. The seat 1 of the present embodiment is capable of holding the seatback 3 in an upright state (lock state) or releasing the restraint relative to the vehicle body 4 so that the seatback 3 changes to an inclinable state (unlock state) based on a function of the lock device 10.

More specifically, as shown in FIGS. 1 to 4, in the present embodiment, the seatback 3 includes a side surface 3a on which a generally rod-shaped striker 11 is located. The striker 11 projects toward the vehicle body 4, which is opposed in a lateral direction of the vehicle.

The lock device 10 includes a latch unit 12, which is configured to be engaged with and disengaged from the striker 11, and a support bracket 13. The latch unit 12 is located on the vehicle body 4 with the support bracket 13 arranged in between.

More specifically, the latch unit 12 is fixed to the support bracket 13 having a contour obtained from a generally U-shaped cross-section. This locates the latch unit 12 at a position that allows for engagement with the striker 11, which is located on the side surface 3a, when the seatback 3 is in the upright state (refer to FIG. 1). The lock device 10 of the present embodiment is capable of holding the seatback 3 in the upright state when the striker 11 engages the latch unit 12.

Figure 4:
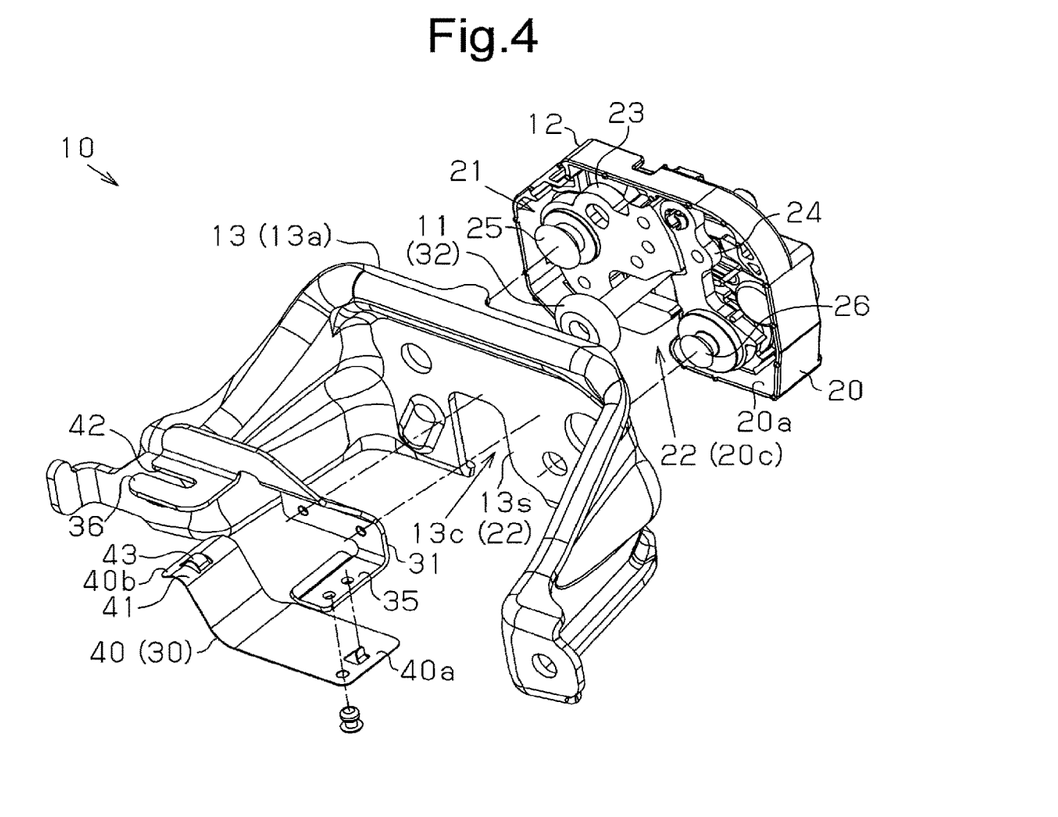
FIG. 4 is an exploded perspective view of the lock device.
Figure 5:
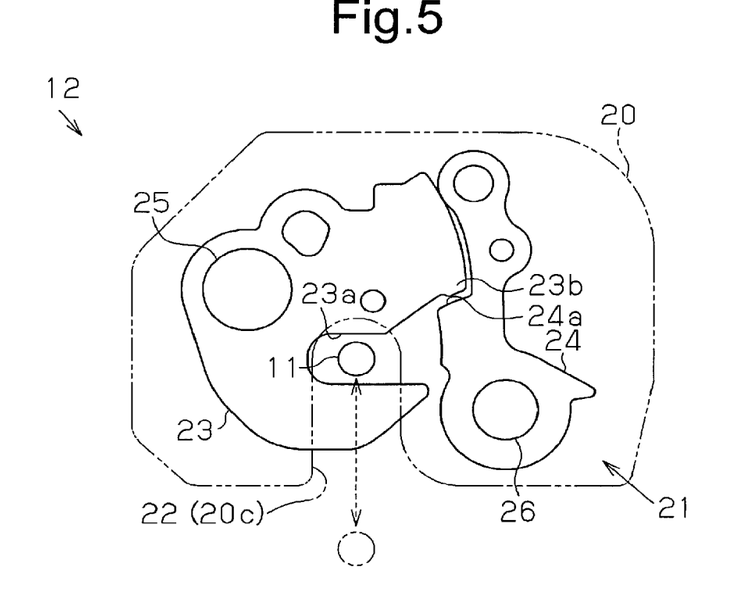
FIG. 5 is a schematic diagram showing the structure of a lock unit.

In further detail, as shown in FIGS. 4 and 5, the latch unit 12 of the present embodiment has a known structure in which each component of a latch mechanism 21 is coupled to a base bracket 20, which functions as a holding member.

Figure 3:
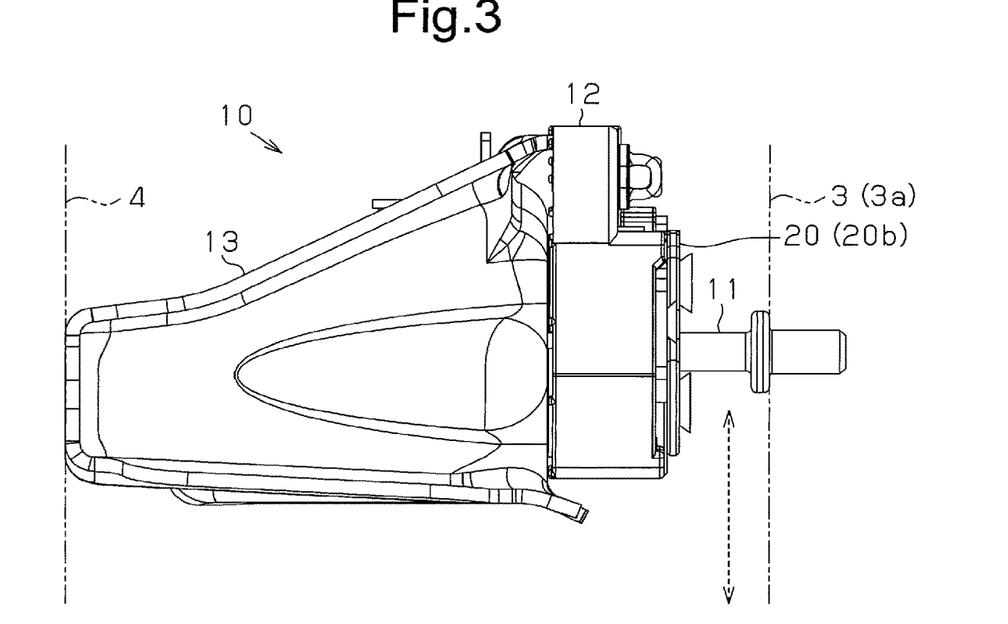
FIG. 3 is a plan view of the lock device.

More specifically, the latch unit 12 of the present embodiment includes the base bracket 20 having the form of a box that has a closed end and is oblong in the thickness-wise direction (sideward direction in FIG. 3). The latch unit 12 is supported by the support bracket 13 with an opening 20a of the base bracket 20 closed by a fixing portion 13a of the support bracket 13.

The latch unit 12 of the present embodiment includes a slit 22 that allows for entrance and exit of the striker. The base bracket 20 includes a lower wall 20b that is opposed to the fixing portion 13a of the support bracket 13 in the vehicle lateral direction (sideward direction in FIG. 3) when the latch unit 12 is fixed to the support bracket 13. The lower wall 20b and the fixing portion 13a are each cut to form a slit defining the slit 22. More specifically, the slit 22 includes a cutaway portion 20c, formed in the lower wall 20b of the base bracket 20, and a cutaway portion 13c, formed in the fixing portion 13a of the support bracket 13. The lock device 10 of the present embodiment is configured so that the striker 11 located on the seatback 3 enters and exits the slit 22.

Additionally, the base bracket 20 accommodates a latch 23, which includes a pivotally supported striker engagement portion 23a, and a pawl 24, which is engaged with and disengaged from the latch 23.

The latch 23 is supported by a pivot shaft 25 that extends in the thickness-wise direction (direction orthogonal to the plane of FIG. 5) of the latch unit 12 so that the striker engagement portion 23a is opposed to the slit 22. The latch 23 is urged by a spring member (not shown) in a circumferential direction (clockwise direction in FIG. 5) so that an opening of the striker engagement portion 23a extends to intersect an entrance direction of the striker 11 (direction from lower side to upper side in FIG. 5). Thus, the latch unit 12 of the present embodiment is configured so that the striker 11 engages the striker engagement portion 23a of the latch 23 when entering the slit 22.

Additionally, the latch 23 is configured to pivot against the urging force of the spring member (in counterclockwise direction in FIG. 5) when pressed by the striker 11 that is engaged with the striker engagement portion 23a. In the present embodiment, a pivot position where the open direction of the striker engagement portion 23a is substantially orthogonal to the extension direction of the slit 22 (vertical direction in FIG. 5) refers to a latch position in which the striker 11 that is engaged with the latch 23 may be restrained in an unremovable manner.

The pawl 24 is supported by a rotation shaft 26. The rotation shaft 26 and the pivot shaft 25 of the latch 23 are located at opposite sides of the slit 22 in the width-wise direction of the slit 22 (sideward direction in FIG. 5) and extend substantially parallel to each other. The pawl 24 is configured to slide on a peripheral surface of the latch 23 when urged by a spring member (not shown) in a circumferential direction (counterclockwise direction in FIG. 5). The pawl 24 includes a latch engagement portion 24a that engages a pivot restriction portion 23b when the latch 23 pivots to the latch position as described above. This restricts pivoting of the latch mechanism 21 of the present embodiment in a direction that the spring member urges the latch 23, that is, a direction in which the striker 11 exits from the slit 22 (clockwise direction in FIG. 5). Thus, the striker 11 can be restrained to the latch 23 in an inseparable manner (lock state).

The pawl 24 is configured to pivot in a direction (clockwise direction in FIG. 5) parting from the peripheral surface of the latch 23 against the urging force of the spring member when a release lever (not shown) is operated. This separates the latch engagement portion 24a from the pivot restriction portion 23b in the latch mechanism 21 of the present embodiment and allows the latch 23 to pivot in the direction that the striker 11 exits from the slit 22. That is, the engagement between the latch 23 and the striker 11 is released (unlock state).

Pop-Up Function

The pop-up function of the lock device 10 of the present embodiment will now be described.

Figure 2:
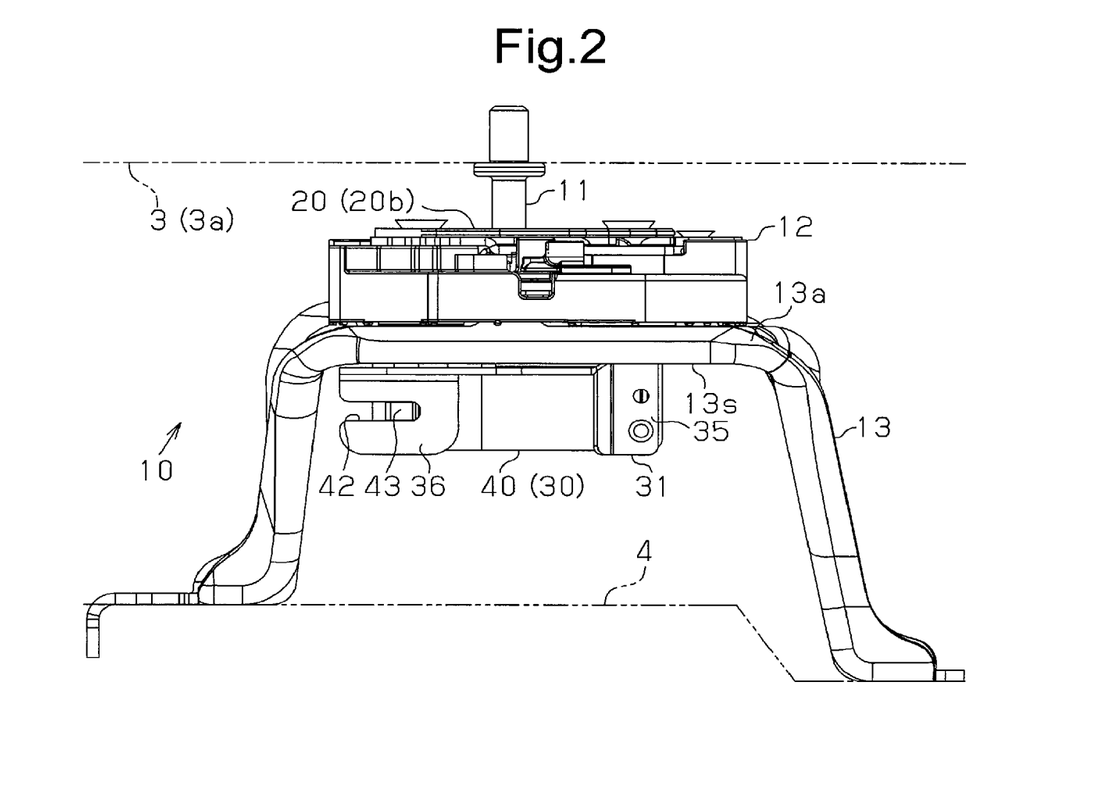
FIG. 2 is a side view of the lock device.
Figure 6:
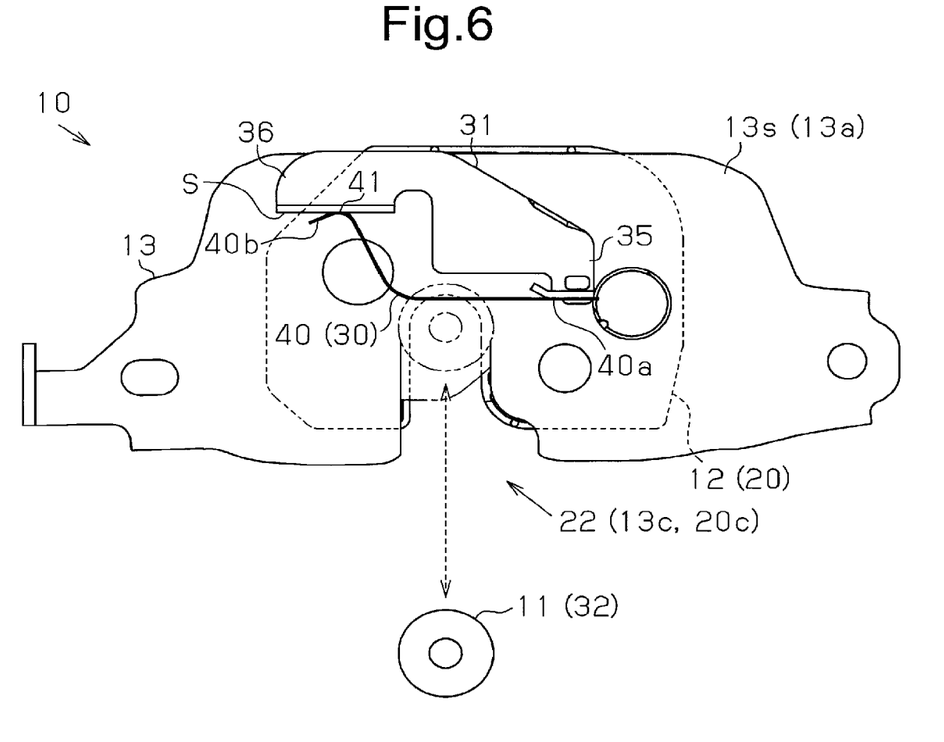
FIG. 6 is a side view of the lock device (view of rear surface of support bracket).

As shown in FIGS. 2, 4, and 6, the lock device 10 of the present embodiment includes a support member 31 that supports a spring member 30 outside the latch unit 12 so that the spring member 30 extends in the width-wise direction of the slit 22. When the striker 11 enters the slit 22, the spring member 30 applies urging force to the striker 11 in the exit direction (direction from upper side to lower side in FIG. 6) in accordance with the spring force (elastic resilient force) of the spring member 30.

More specifically, the support member 31 of the present embodiment is fixed to a rear side of the support bracket 13 that is opposed to the vehicle body 4, namely, a rear surface 13s of the fixing portion 13a. The support member 31 includes a first support portion 35 and a second support portion 36 at two separate positions with the slit 22 located in between in the width-wise direction of the slit 22. The support member 31 supports the spring member 30 when the spring member 30 bridges the first support portion 35 and the second support portion 36 so that the spring member 30 extends in the width-wise direction of the slit 22.

More specifically, the lock device 10 of the present embodiment is configured so that when the striker 11 enters the slit 22 of the latch unit 12, the striker 11 moves in the extension direction (vertical direction in FIG. 6) of the slit 22 while pressing the latch 23 and contacts the spring member 30 supported by the support member 31. In the present embodiment, the spring member 30 elastically deforms and applies urging force to the striker 11 in the direction in which the striker 11 exits the slit 22.

In the present embodiment, the striker 11 includes a distal end that includes a generally disk-shaped terminal member 32 having a larger diameter than a body (shank) of the striker 11. The spring member 30 is arranged to contact the striker 11 at an entrance position where the striker 11 engages the striker engagement portion 23a of the latch 23. In the present embodiment, when the striker 11 is disengaged from the latch 23, the urging force applied by the spring member 30 in the exit direction releases the striker 11, that is, discharges the striker 11, from the slit 22 (pop-up function).

In further detail, as shown in FIG. 6, in the present embodiment, a generally L-shaped bent plate spring 40 is used as the spring member 30. When a longitudinal end (first end 40a located at right side of FIG. 6) of the plate spring 40 is immovably fixed to the first support portion 35 of the support member 31, the plate spring 40 extends in the width-wise direction of the slit 22.

In the present embodiment, the second support portion 36 of the support member 31 includes a contact surface S. The contact surface S is in contact with a further end (second end 40b located at left side of FIG. 6) of the plate spring 40, which extends across the slit 22, from a side (upper side in FIG. 6) opposite to the striker 11.

More specifically, in the present embodiment of the plate spring 40, the second end 40b, which is a free end, includes an arc-shaped contact portion 41 projecting toward the second support portion 36. The arc-shaped contact portion 41 is supported by the second support portion 36 and slidable on the contact surface S.

As shown in FIG. 4, in the present embodiment, the contact surface S of the second support portion 36 includes a guide groove 42 extending in the width-wise direction of the slit 22. The arc-shaped contact portion 41 of the plate spring 40 includes an engagement projection 43 that engages the guide groove 42. More specifically, the guide groove 42 (guide) is a recess extending in the width-wise direction of the slit 22. The arc-shaped contact portion 41 includes the engagement projection 43 projecting toward the second support portion 36 and engaging the guide groove 42.

Figure 7:
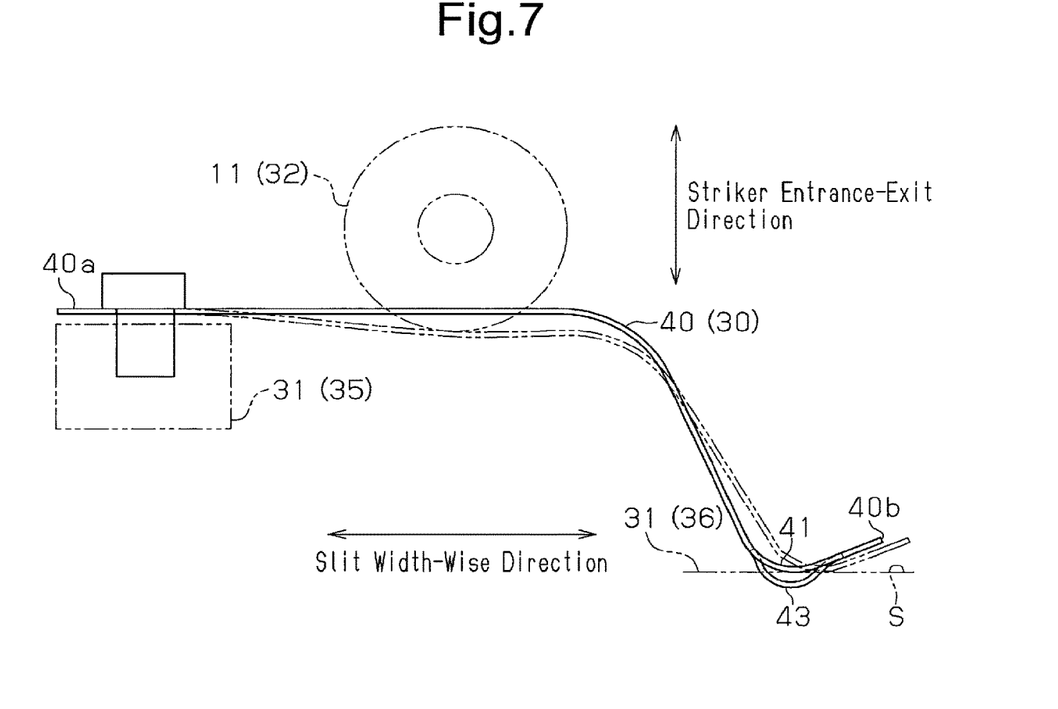
FIG. 7 is a diagram showing the operation of a support member.

More specifically, as shown in FIG. 7, the plate spring 40 includes one end, which is a fixing end, supported by the support member 31. When pressed by the striker 11, the plate spring 40 is elastically deformed so that the arc-shaped contact portion 41, which is located on the contact surface S, slides in the longitudinal direction of the plate spring 40, that is, the width-wise direction of the slit 22. In the present embodiment, the guide groove 42, which engages the engagement projection 43, guides the sliding of the arc-shaped contact portion 41 in the width-wise direction of the slit 22. This structure ensures smooth elastic deformation of the plate spring 40.

The present embodiment has the advantages described below.

(1) The lock device 10 includes the latch unit 12, which includes the slit 22 and is engaged with and disengaged from the striker 11, and the support member 31, which supports the spring member 30 outside the latch unit 12 so that the spring member 30 extends in the width-wise direction of the slit 22. When the striker 11 enters the slit 22 and contacts the spring member 30, the spring member 30 deforms. Consequently, the spring member 30 applies urging force to the striker 11 in the direction the striker 11 exits the slit 22.

The above simple structure provides the lock device 10 with the pop-up function that allows the striker 11 to quickly exit the slit 22 when disengaged from the latch unit 12. Additionally, the task for coupling the spring member 30 is completed by fixing the support member 31 outside the latch unit 12. This limits complication of the manufacturing process. Further, there is no need to greatly change the specifications of the components of the latch unit 12. This ensures high versatility.

When the spring member 30 is located outside the latch unit 12, the degree of design freedom for the spring member 30 increases. Thus, stable urging force may be applied to the striker 11 in conformance with the shape of the striker 11. Additionally, the high degree of layout freedom may be utilized to improve ornamental properties, for example, by concealing the spring member 30 so that the spring member 30 cannot be seen by users.

(2) The support member 31 includes the first support portion 35 and the second support portion 36. The first support portion 35 immovably fixes an end (first end 40a) of the spring member 30, which extends across the slit 22. The second support portion 36 is in contact with a further end (second end 40b) of the spring member 30 at a side opposite to the striker 11 with respect to the spring member 30 while allowing for the sliding on the contact surface S.

In the above structure, the spring member 30 is stably supported from two sides, that is, at two positions located on opposite sides of the slit 22 in the width-wise direction of the slit 22, without hindering the elastic deformation of the spring member 30. This applies stable urging force to the striker 11 when contacting the spring member 30.

(3) The contact surface S of the second support portion 36 includes the guide groove 42, which extends in the width-wise direction of the slit 22. The contact portion (arc-shaped contact portion 41) of the spring member 30 includes the engagement projection 43 engaging the guide groove 42.

More specifically, when pressed by the striker 11, the spring member 30, which is supported by the support member 31 at one end (first end 40a) defining the fixed end, elastically deforms so that the free end (second end 40b) expands and contracts in the longitudinal direction of the spring member 30, that is, the width-wise direction of the slit 22. In this regard, in the above structure, the guide groove 42 formed in the contact surface S functions as the guide that guides the contact portion of the spring member 30 in the width-wise direction of the slit 22 when sliding on the contact surface S. This ensures smooth elastic deformation of the spring member 30 and applies further stable urging force to the striker 11.

(4) The plate spring 40 is used as the spring member 30. This generates large spring force with a small deformation amount (stroke amount pressed by striker 11). Additionally, the desired spring force may be easily set based on the spring width of the plate spring 40. Further, a larger contact area of the plate spring 40 stabilizes the urging of the striker 11. The oscillations of the plate spring 40 easily converge. This limits occurrences of a rattling noise.

The above embodiment may be modified as follows.

In the above embodiment, the plate spring 40 is used as the spring member 30. However, the spring member 30 may have any structure. For example, one end of a torsion coil spring may extend in the width-wise direction of the slit 22. Alternatively, a coil spring and a contact plate may be combined.

In the above embodiment, the support member 31 supports the spring member 30 from two sides. Instead, the spring member 30 may be supported in a cantilevered manner. As long as the elastic deformation of the spring member 30 is ensured, both ends of the spring member 30, which extends across the slit 22, may be configured to be immovably fixed to a support member.

In the above embodiment, the arc-shaped contact portion 41 projecting toward the second support portion 36 functions as the contact portion of the plate spring 40. However, the contact portion may have any shape.

In the above embodiment, the contact surface S of the second support portion 36 includes the guide groove 42. The contact portion (arc-shaped contact portion 41) of the plate spring 40 includes the engagement projection 43 engaging the guide groove 42. However, the guide may have any structure. For example, when the contact surface S includes a guide having an elongated projection, the contact portion of the plate spring 40 may include a recess that engages the guide. Alternatively, such a guide may be omitted from the structure.

The holding member (base bracket 20) included in the latch unit 12 may have any shape. The latch mechanism 21 (e.g., latch 23 and pawl 24) may have any structure. Also, the striker 11 may have any shape.

Figure 8:
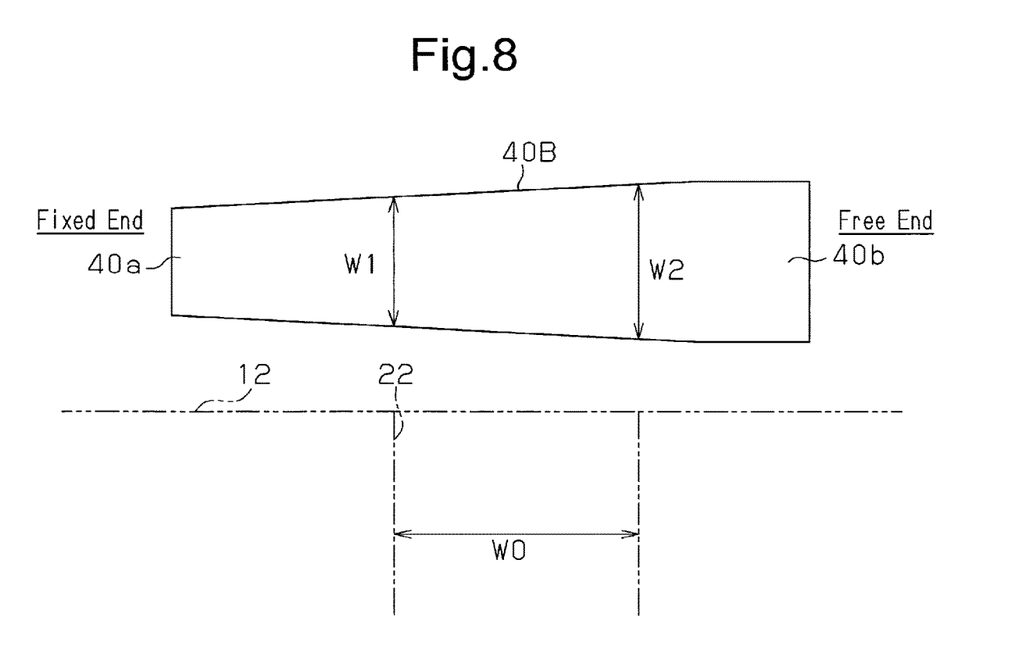
FIG. 8 is a schematic view showing a modified example of a plate spring.

The plate spring may have the shape of a plate spring 40B shown in FIG. 8. The plate spring 40B includes a first end 40a (fixed end) supported by the first support portion 35 and a second end 40b (free end) supported by the second support portion. The plate width W1 of the first end 40a is preferably smaller than the plate width W2 of the second end 40b (W1<W2) in a range (range corresponding to width W0) where the plate spring 40B contacts the striker 11.

For example, if a plate spring has a uniform thickness and a uniform width in the longitudinal direction, the resistance of the plate spring to elastic deformation increases as the position on which pressing force acts becomes closer to the fixed end. That is, the spring force varies in accordance with the contact position of the striker 11. However, the above structure enables the plate spring 40B to generate stable spring force regardless of where the striker 11 contacts. Thus, further stable urging force is applied to the striker 11.

In the above embodiment, the striker 11 is located on the seat 1. The latch unit 12 is located on the vehicle body 4. The latch unit 12 is supported on the vehicle body 4 by the support bracket 13.

Figure 9:
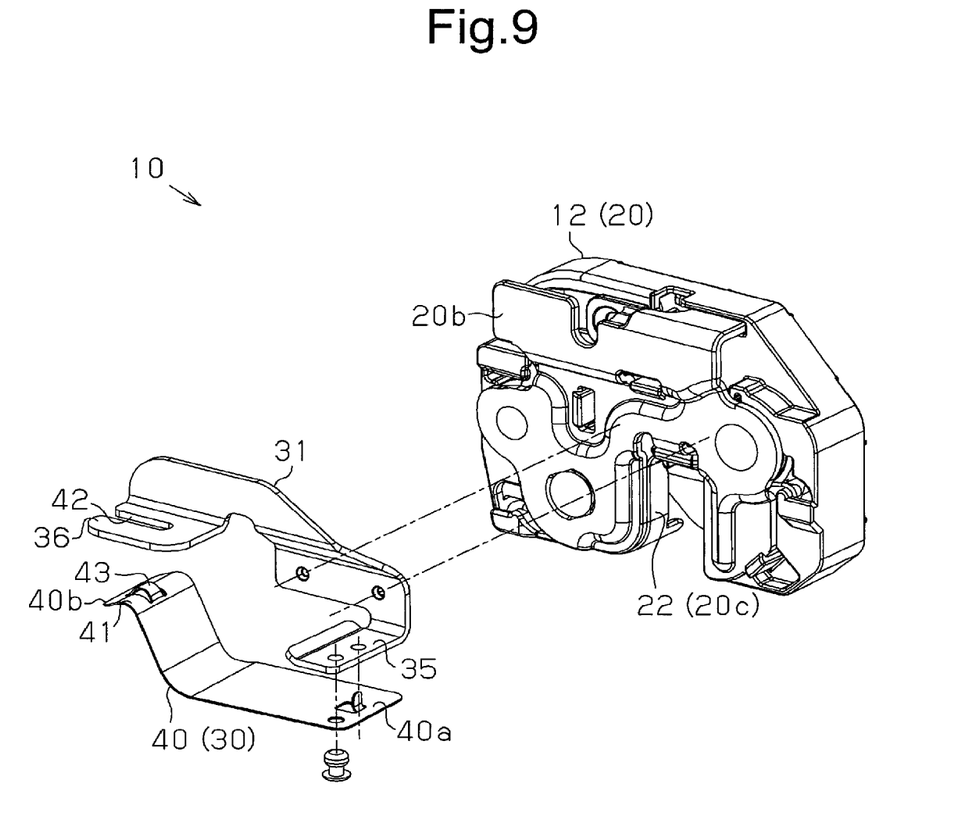
FIG. 9 is an exploded perspective view showing a modified example of a lock device.

Instead, the structure may be such that the striker 11 is located on the vehicle body 4 and the latch unit 12 is located on the seat 1. Additionally, as shown in FIG. 9, the latch unit 12 may be configured to be directly fixed to a support body (seat 1) without the support bracket 13 located in between.

In the above embodiment, the support member 31 is fixed to the rear side (rear surface 13s of fixing portion 13a) of the support bracket 13 that is opposed to the body 4. However, the support member 31 may have any shape and be fixed at any position as long as the spring member 30 extending in the width-wise direction of the slit 22 can be supported beside the latch unit 12. For example, as shown in FIG. 9, the support member 31 may be fixed to the lower wall 20b of the holding member (base bracket 20) included in the latch unit 12.

In the above embodiment, the present invention is embodied in the lock device 10 that is located between the seat 1 and the vehicle body 4. Instead, the present invention may be applied to a lock device used for other purposes.

The invention claimed is:

1. A lock device comprising:
a latch unit configured to be engaged with and disengaged from a striker and including a slit that allows for entrance and exit of the striker;
a support bracket including a first side to which the latch unit is fixed; and
a support member that supports a spring member outside the latch unit so that the spring member extends in a width-wise direction of the slit, the support member being fixed to a second side of the support bracket opposite to the first side,
wherein when the striker enters the slit and contacts the spring member, the spring member elastically deforms and applies urging force to the striker in a direction in which the striker exits from the slit,
the spring member extends across the slit,
the support member includes a first support portion, which immovably fixes a first end of the spring member, and a second support portion,
the second support portion includes a contact surface that contacts a second end of the spring member at a side of the spring member opposite to the striker, and
the second end of the spring member is configured to slide on the contact surface.

2. The lock device according to claim 1, wherein
the second end of the spring member includes a contact portion that slides on the contact surface, and
the second support portion includes a guide that guides the contact portion in the width-wise direction of the slit.

3. The lock device according to claim 2, wherein
the guide is a recess that extends in the width-wise direction of the slit, and
the contact portion includes a projection that projects toward the second support portion and engages the recess.

4. The lock device according to claim 1, wherein the spring member is a plate spring.

5. The lock device according to claim 4, wherein
the plate spring includes a first end supported by the first support portion and a second end supported by the second supported portion, and
a plate width of the first end of the plate spring is smaller than a plate width of the second end of the plate spring in a range that contacts the striker.

* * * * *